(12) United States Patent
Honda et al.

(10) Patent No.: US 9,396,520 B2
(45) Date of Patent: Jul. 19, 2016

(54) PROJECTOR SYSTEM AND CONTROL METHOD THEREOF

(71) Applicant: SEIKO EPSON CORPORATION, Tokyo (JP)

(72) Inventors: Yasuhiro Honda, Shiojiri (JP); Takashi Ozawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 305 days.

(21) Appl. No.: 14/136,055

(22) Filed: Dec. 20, 2013

(65) Prior Publication Data

US 2014/0192089 A1    Jul. 10, 2014

(30) Foreign Application Priority Data

Jan. 9, 2013  (JP) ................................. 2013-001588

(51) Int. Cl.
| | |
|---|---|
| G09G 5/00 | (2006.01) |
| G06T 3/40 | (2006.01) |
| G03B 21/14 | (2006.01) |
| G06F 3/00 | (2006.01) |
| G06F 3/041 | (2006.01) |
| G06F 3/042 | (2006.01) |
| G06F 3/0484 | (2013.01) |
| G06F 3/0488 | (2013.01) |

(52) U.S. Cl.
CPC . *G06T 3/40* (2013.01); *G03B 21/14* (2013.01); *G06F 3/005* (2013.01); *G06F 3/0416* (2013.01); *G06F 3/0425* (2013.01); *G06F 3/04845* (2013.01); *G06F 3/04883* (2013.01)

(58) Field of Classification Search
CPC .................. G03B 21/14–21/53; G06F 3/0386
See application file for complete search history.

(56) References Cited

U.S. PATENT DOCUMENTS

| | | | | |
|---|---|---|---|---|
| 6,050,690 A | * | 4/2000 | Shaffer | G03B 21/53 353/121 |
| 7,559,656 B2 | * | 7/2009 | Yumiki | G03B 17/54 353/42 |
| 8,591,039 B2 | * | 11/2013 | Morrison | G06F 3/0412 348/745 |
| 2004/0041786 A1 | * | 3/2004 | Inoue | G06F 3/0386 345/156 |
| 2006/0158425 A1 | * | 7/2006 | Andrews | H04N 5/74 345/156 |
| 2007/0097335 A1 | * | 5/2007 | Dvorkis | H04N 9/3129 353/94 |
| 2012/0212408 A1 | | 8/2012 | Iimura | |
| 2012/0229249 A1 | * | 9/2012 | Gritti | G01S 15/04 340/4.34 |

FOREIGN PATENT DOCUMENTS

| | | |
|---|---|---|
| JP | A-2011-140154 | 7/2011 |
| JP | A-2012-173911 | 9/2012 |

* cited by examiner

*Primary Examiner* — Charles Tseng
(74) *Attorney, Agent, or Firm* — Oliff PLC

(57) ABSTRACT

A projector system includes: a position detecting unit that detects a pointed position of a pointer on a projection surface; a drawing unit that performs drawing on the projection surface according to the pointed position detected by the position detecting unit; a height detecting unit that detects a height of a user of a projector; and a display changing unit that changes, according to the user's height detected by the height detecting unit, at least one of a shape of the image projected onto the projection surface and a display position of the image on the projection surface.

8 Claims, 10 Drawing Sheets

PROJECTOR SYSTEM AND CONTROL METHOD THEREOF

The entire disclosure of Japanese Patent Application No. 2013-1588, filed Jan. 9, 2013 is expressly incorporated by reference herein.

BACKGROUND

1. Technical Field

The present invention relates to a projector system and a control method thereof.

2. Related Art

Heretofore, an interactive system has been proposed, in which an image based on an image signal output from a computer or the like is displayed on a screen or the like by a projector, a user's operation performed on a projection image using an electronic pen is detected by the projector, and an image based on information relating to the user's operation is generated and displayed (for example, JP-A-2011-140154).

In such an interactive system, however, when the user performs an input operation with the electronic pen or the like, the user cannot reach an upper portion of a projection surface in some cases. In such a case, the user can cope with the situation by standing on a platform or the like, which is inconvenient.

SUMMARY

An advantage of some aspects of the invention is to solve at least a part of the problems described above, and the invention can be implemented as the following forms or application examples.

Application Example 1

According to a projector system of this application example, a position detecting unit detects a position pointed to by a pointer. A drawing unit performs drawing in a projection image according to the position pointed to by the pointer. A height detecting unit detects a height (reachable height) of a user of a projector. A display changing unit changes, according to the user's height, at least one of a shape of the projection image and a projection position of the image. With this configuration, the user can perform a drawing operation on the projection image changed according to the user's height.

Application Example 2

In the application example described above, the display changing unit reduces the shape of the projection image. With this configuration, since the projection image is reduced according to a user's height, even a short user can perform a drawing operation on the projection image.

Application Example 3

In the application example described above, the display changing unit reduces the shape of the projection image in a height direction. With this configuration, since the projection image is reduced according to a user's height, even a short user can perform a drawing operation on an upper portion of the projection image.

Application Example 4

In the application example described above, the display changing unit moves a display position of the projection image downward. With this configuration, since the projection image is moved downward according to a user's height, even a short user can perform a drawing operation on an upper portion of the image.

Application Example 5

In the application example described above, when the height detecting unit detects that the user does not exist, the display changing unit restores the projection image to its initial state shape and projection position. With this configuration, the changed projection image can be restored to its original state.

Application Example 6

In the application example described above, when the position detecting unit detects pointing performed on a predetermined area with the pointer, the display changing unit changes the projection image according to the pointed position. With this configuration, the user can perform a drawing operation on the projection image changed according to the position pointed to by the pointer.

Application Example 7

In the application example described above, when the position detecting unit detects pointing performed at a predetermined position on the projection image with the pointer, the display changing unit restores the projection image to its initial state shape and projection position. With this configuration, the changed projection image can be restored to its original state.

When the projector system and the control method thereof are configured using a computer included in a projector or a PC (including a PDA and a smartphone), the modes or application examples described above can be configured in the form of a program for realizing the functions, or a recording medium or the like on which the program is recorded to be readable by the computer. As the recording medium, it is possible to utilize various media readable by the computer, such as a flexible disk, an HDD (Hard Disk Drive), a CD-ROM (Compact Disk Read Only Memory), a DVD (Digital Versatile Disk), a Blu-ray Disc (registered trademark), a magneto-optical disc, a non-volatile memory card, an internal storage device (a semiconductor memory such as a RAM (Random Access Memory) or a ROM (Read Only. Memory)) of the projector, and an external storage device (a USE (Universal Serial Bus) memory or the like).

BRIEF DESCRIPTION OF THE DRAWINGS

The invention will be described with reference to the accompanying drawings, wherein like numbers reference like elements.

FIGS. 1A and 1B are explanatory views showing modes of use of an interactive system according to a first embodiment, in which FIG. 1A is an explanatory view showing a normal mode of use; and FIG. 1B is an explanatory view showing a mode of use in which a projection image is reduced.

FIGS. 4A and 4B are explanatory views on reduction of image data, in which FIG. 4A is an explanatory view of normal image data; and FIG. 4B is an explanatory view of reduced image data.

FIGS. 5A and 5B are explanatory views of image data when the image data is restored to its original size, in which FIG. 5A is an explanatory view of the image data in a reduced state; and FIG. 5B is an explanatory view of the image data in a state of being restored to the original size.

FIGS. 9A and 9B are explanatory views of image data of a projector according to a second embodiment, in which FIG. 9A is an explanatory view of normal image data; and FIG. 9B is an explanatory view of reduced image data.

DESCRIPTION OF EXEMPLARY EMBODIMENTS

First Embodiment

As a first embodiment, a hanging-type projector that measures a height of a user, reduces an image according to the height, and projects the image, and an interactive system will be described below.

Figure 1A:
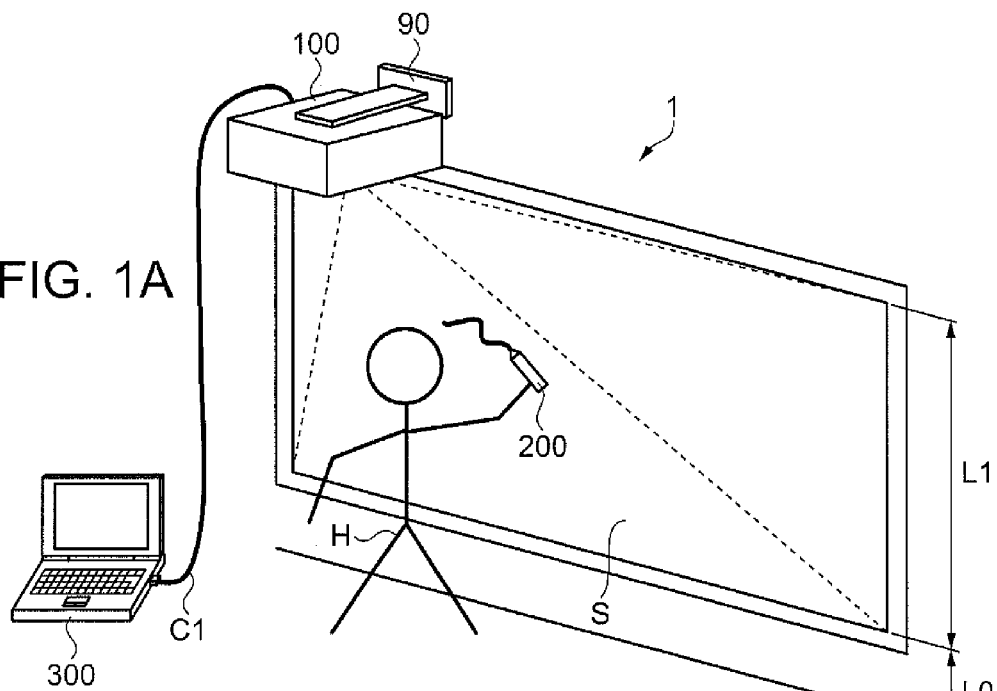
Figure 1B:
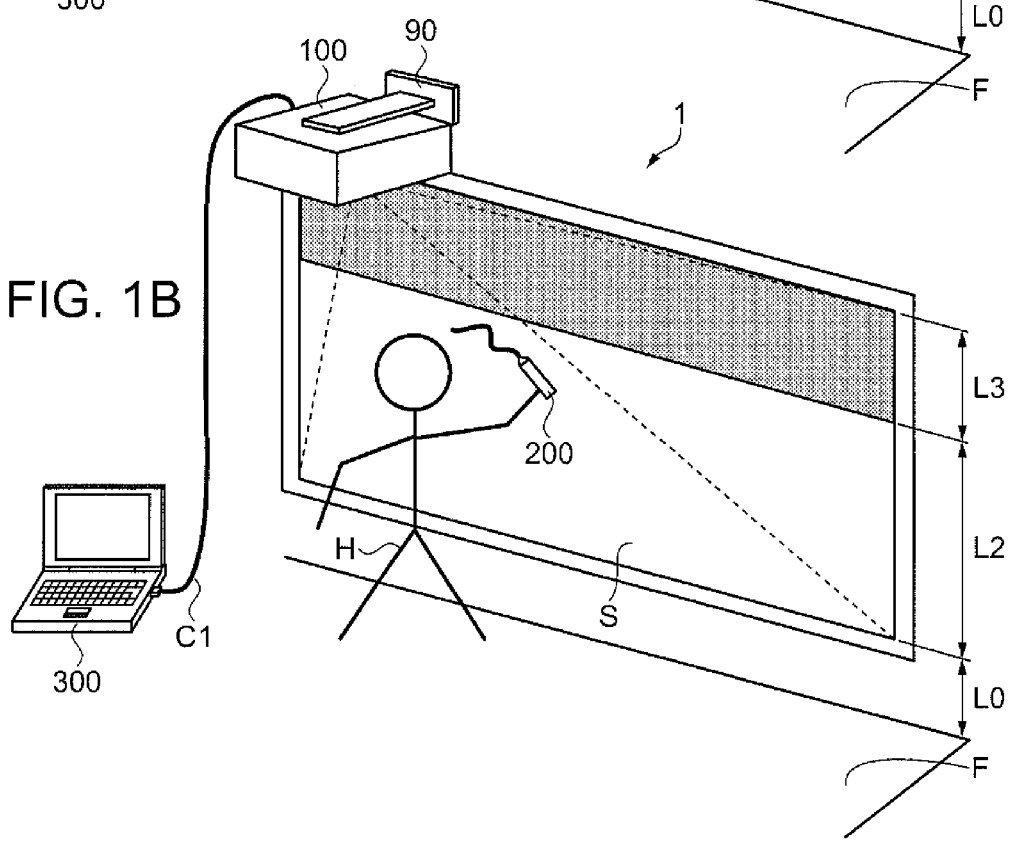

FIGS. 1A and 1B are explanatory views showing modes of use of the interactive system according to the first embodiment, in which FIG. 1A is an explanatory view showing a normal mode of use; and FIG. 1B is an explanatory view showing a mode of use in which a projection image is reduced.

FIGS. 1A and 1B show a form in which a user H makes a presentation. As shown in FIGS. 1A and 1B, in the interactive system 1 of the embodiment, a projector 100, a light-emitting pen 200 as a pointer that sends a light signal, a personal computer (PC) 300, the user H who holds the light-emitting pen 200, and a projection surface S such as a whiteboard are shown.

The projector 100 is attached via an attaching member 90 to a wall surface above the projection surface S and projects an image onto the projection surface S. The projector 100 includes a projection lens (not shown in FIGS. 1A and 1B) and an imaging unit (not shown in FIG. 1A or 1B) formed of a CCD (Charge Coupled Device) sensor or the like. A projection image projected through the projection lens is projected onto the projection surface S. In FIGS. 1A and 1B, projection image light is shown by broken lines. The imaging unit captures an image of the projection surface S so as to cover a range including the projection image.

The projector 100 is connected to the PC 300 via a cable C1. The PC 300 supplies an image signal to the projector 100. In the embodiment, the cable C1 is an analog RGB cable, but may be another type of cable. For example, the cable C1 may be an HDMI (High-Definition Multimedia Interface) cable, a USB cable, or the like.

For the light-emitting pen 200, position calibration is previously performed on the projection surface S. When the user H performs an input operation (drawing operation) on the projection surface S with the light-emitting pen 200, the imaging unit of the projector 100 captures an image only of light of the light-emitting pen 200 through an infrared filter (not shown), detects a position at which the input operation is performed, and stores, based on the position, drawing data in a drawing memory (not shown) of the projector 100. Then, the projector 100 can combine the drawing data with image information and project an image.

In FIG. 1A, the user H performs an input operation at a substantially center portion of a projection image having a height L1. And, L0 is a height from floor surface F to the bottom of the projection surface S. However, the user cannot reach an upper portion of the projection image and therefore cannot perform an input operation in the upper portion. In FIG. 1B, the projection image is reduced in a height direction and projected in a portion having a height L2. The reduced projection image having the height L2 is obtained by, without moving a lower edge of the projection image having the height L1 before being reduced, reducing the projection image in the height direction. For this reason, an upper edge of the reduced projection image having the height L2 is lower than that of the projection image having the height L1 before being reduced. This lowered portion is referred to as L3. In the top portion L3, an image is not projected (drawn in black on a light valve, and black projection is performed in the portion L3 of the projection surface S). By doing this, the user H can perform an input operation in the upper portion of the reduced projection image. Hereinafter, the projector 100 that reduces a projection image in this manner will be described.

Figure 2:
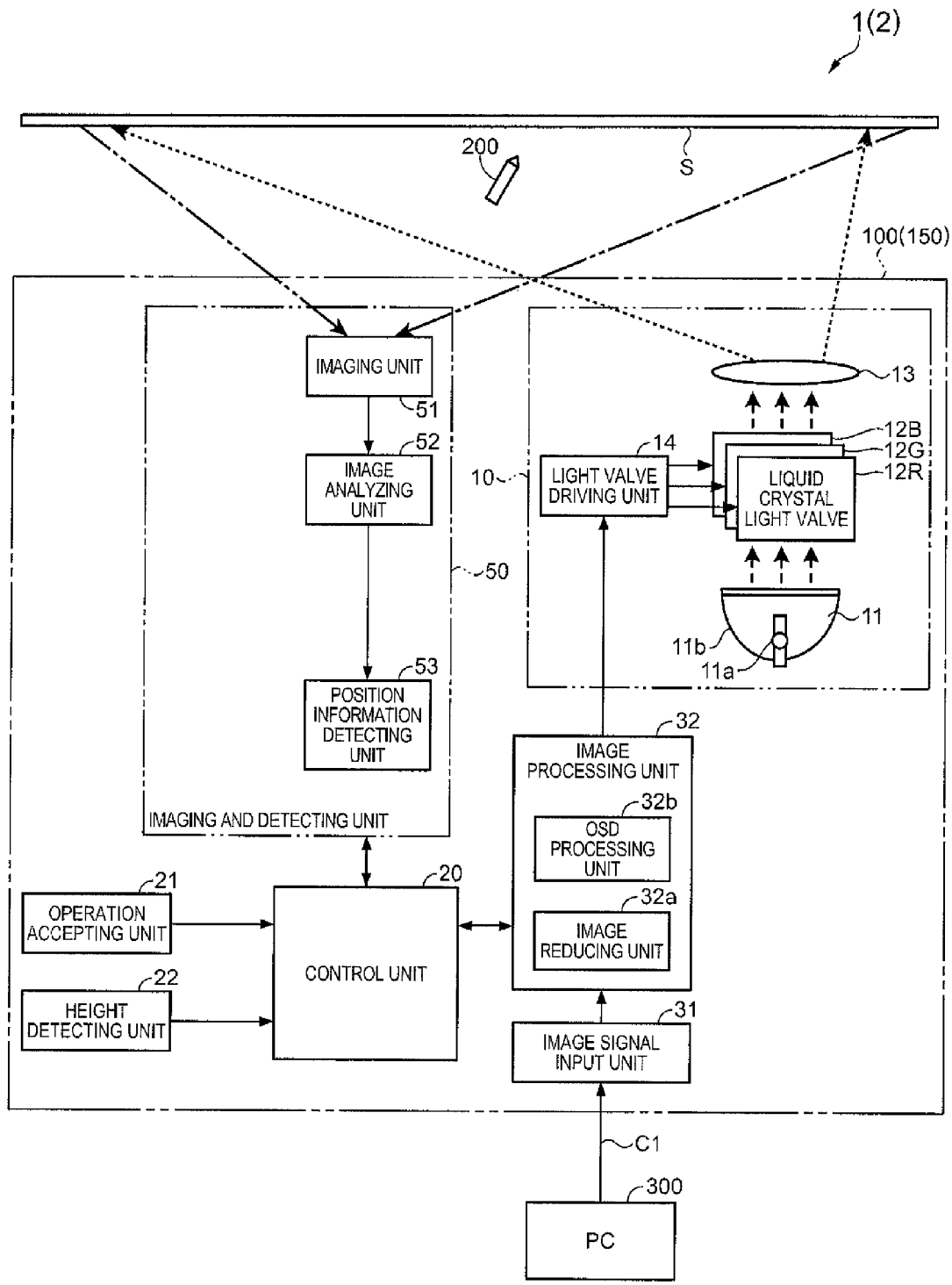
FIG. 2 is a block diagram showing a configuration of a projector according to the first embodiment.

FIG. 2 is a block diagram showing a configuration of the projector 100 according to the first embodiment. In FIG. 2, the light-emitting pen 200, the PC 300, and the projection surface S are shown in addition to the projector 100. With these constituents, the interactive system 1 is realized.

The projector 100 is configured to include an image projecting unit 10 as a display unit, a control unit 20, an operation accepting unit 21, a height detecting unit 22, an image signal input unit 31, an image processing unit 32, and an imaging and detecting unit 50 as a position detecting unit.

The image projecting unit 10 includes a light source 11, three liquid crystal light valves 12R, 12G, and 12B each as a light modulating device, a projection lens 13 as a projection optical system, and a light valve driving unit 14. The image projecting unit 10 modulates light emitted from the light source 11 with the liquid crystal light valves 12R, 12G, and 12B, and projects the modulated image light through the projection lens 13 to display an image on the projection surface S or the like.

The light source 11 is configured to include a discharge-type light source lamp 11a formed of an extra-high-pressure mercury lamp, a metal halide lamp, or the like and a reflector 11b that reflects light emitted by the light source lamp lie toward the liquid crystal light valves 12R, 12G, and 12B sides. The light emitted from the light source 11 is converted by an integrator optical system (not shown) into light having a substantially uniform brightness distribution. The light is separated by a color separating optical system (not shown) into respective color light components of red R, green G, and blue B as three primary colors of light. Thereafter, the respective color light components are respectively incident on the liquid crystal light valves 12R, 12G, and 12B.

Each of the liquid crystal light valves 12R, 12G, and 12B includes a liquid crystal panel having liquid crystal sealed between a pair of transparent substrates. In each of the liquid crystal light valves 12R, 12G, and 12B, a plurality of pixels (not shown) arranged in a matrix are formed, and a drive voltage can be applied to the liquid crystal pixel by pixel. When the light valve driving unit 14 applies a drive voltage according to input image information to each pixel, the pixel is set to a light transmittance according to the image information. For this reason, the light emitted from the light source 11 is modulated by transmitting through the liquid crystal light valves 12R, 12G, and 12B, and an image according to the image information is formed for the respective colors. The formed respective color images are combined by a color combining optical system (not shown) pixel by pixel to form a color image. Thereafter, the color image is projected through the projection lens 13.

The control unit 20 includes a CPU (Central Processing Unit), a RAM used for temporary storage or the like of various types of data, and a non-volatile memory such as a mask ROM, a flash memory, or a FeRAM (Ferroelectric RAM) (not shown). The CPU operates according to control programs stored in the non-volatile memory, so that the control unit 20 collectively controls operations of the projector 100. Moreover, the control unit 20 includes a timer (not shown) that performs timing.

The operation accepting unit 21 accepts an input operation from the user, and includes a plurality of operating keys for the user to perform various instructions on the projector 100. The operating keys of the operation accepting unit 21 include a power supply key for switching a power supply between on and off states, a menu key for switching between display and non-display of a menu image for performing various settings, cursor keys used for movement or the like of a cursor in the menu image, and an enter key for entering the various settings. When the user operates (presses down) the various operating keys of the operation accepting unit 21, the operation accepting unit 21 accepts this input operation and outputs an operating signal according to the content of the user's operation to the control unit 20.

The operation accepting unit 21 may adopt a configuration using a remote control (not shown). In this case, the remote control sends an operating signal such as an infrared ray according to the content of the user's operation, and a remote-control signal receiving unit (not shown) receives the signal and transmits the signal to the control unit 20.

The height detecting unit 22 is configured to include a distance sensor (ranging module), and measures a height of the user H. In the embodiment, the ranging module measures a distance between the projector 100 and the user H in a non-contact manner using an infrared LED (Light-Emitting Diode) and an optical position sensor. Information of the measured distance is input to the control unit 20. The distance sensor is not limited to a sensor using an infrared ray, but may be a distance sensor using a laser beam, an ultrasonic wave, or the like.

Moreover, when the light-emitting pen 200 is a reflective pen, the height detecting unit 22 may detect the position of the reflective pen and also measure the user H's height.

Figure 3:
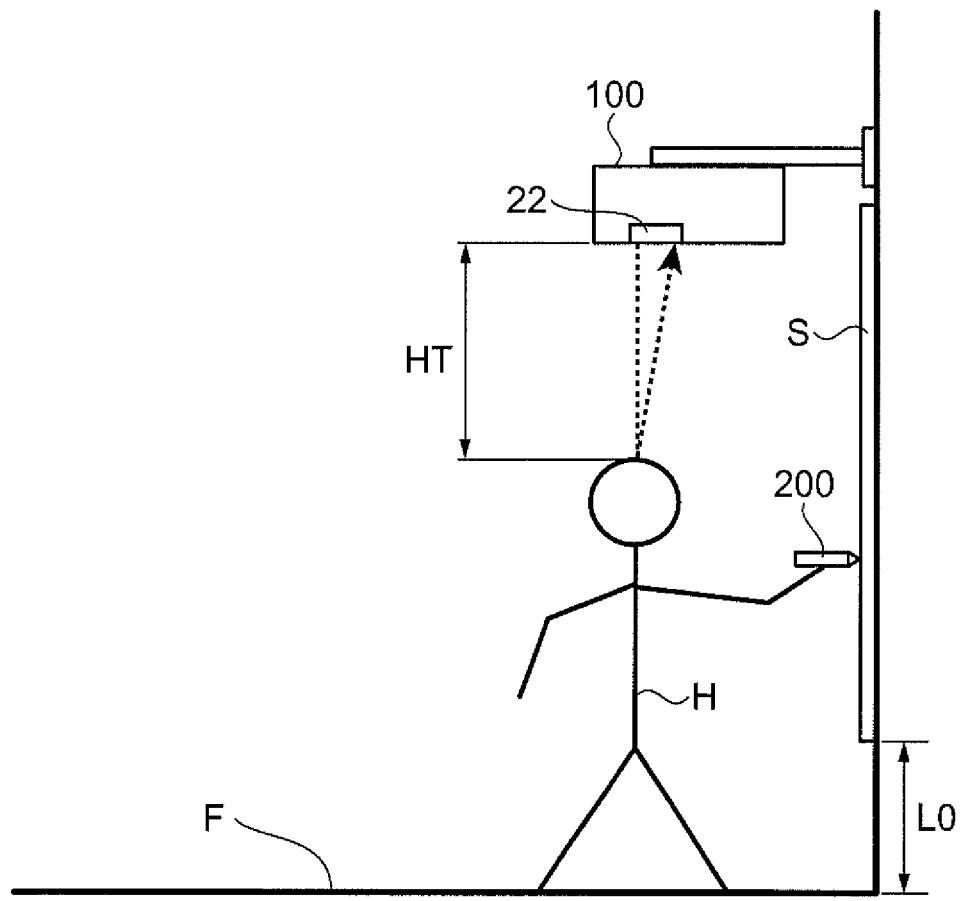
FIG. 3 is an explanatory view of a form in which the projector measures a distance between the projector and a user.

FIG. 3 is an explanatory view of a form in which the projector 100 measures the distance between the projector and the user H. As shown in FIG. 3, the height detecting unit 22 of the projector 100 emits an infrared ray as shown by a broken line, receives reflected light from the head of the user H, and thereby measures a distance HT between the projector 100 and the user H. Then, by subtracting the distance HT from an installation height of the projector 100, the user H's height can be calculated. When the height is zero, that is, when the distance between the projector 100 and the user H is the same as a distance between the projector 100 and a floor surface F, the height detecting unit 22 determines that the user H does not exist. The installation height of the projector 100 is previously stored in the storage unit of the projector 100, or the height relative to the floor surface is measured in the absence of the user H and stored in the storage unit (a RAM or a flash memory).

Referring back to FIG. 2, the image signal input unit 31 is provided with an input terminal (not shown) for connecting to the PC 300 via the cable C1. With the input terminal, an image signal is input from the PC 300 to the image signal input unit 31. The image signal input unit 31 converts the input image signal into image information in a form processable by the image processing unit 32, and outputs the image information to the image processing unit 32.

The image processing unit 32 is configured to include an image reducing unit 32a and an OSD processing unit 32b. The image processing unit 32 converts the image information input from the image signal input unit 31 into image data representing gray scales of the pixels of the liquid crystal light valves 12R, 12G, and 12B, and outputs the image data to the light valve driving unit 14. The converted image data, which is composed of image data of the respective color lights of R, G, and B, includes a plurality of pixel values corresponding to all the pixels of the liquid crystal light valves 12R, 12G, and 12B. The pixel value specifies a light transmittance of the corresponding pixel. By this pixel value, the intensity (gray scale) of light emitted from each pixel is defined. Moreover, the image processing unit 32 performs, based on an instruction of the control unit 20, an image quality adjusting process or the like for adjusting brightness, contrast, sharpness, hue, or the like on the converted image data.

The image reducing unit 32a reduces the image data based on an instruction of the control unit 20. Specifically, the image reducing unit 32a performs thinning of the pixel values on the image data, without moving a lower edge of the image data, to compress the image data in the height direction (vertical direction). A reduction ratio in this case is determined by the control unit 20 based on the user H's height obtained based on the distance HT between the projector 100 and the user H input from the height detecting unit 22. The reduction ratio is transmitted to the image reducing unit 32a. For pixels of the top portion over the reduced image data (that is, pixels in an area in which the pixel values do not exist because the image data is reduced), a black pixel value, that is, a pixel value at which a light transmittance is minimum is set.

When receiving an instruction from the control unit 20 not to reduce the image data, the image reducing unit 32a does not reduce the image data. Therefore, when the image reducing unit 32a reduces the image data in response to an instruction from the control unit 20 to reduce the image data and thereafter receives an instruction not to reduce the image data, the image reducing unit 32a stops the thinning process of the pixel values and restores the image data to its original (default) size. The image reducing unit 32a corresponds to the display changing unit.

Figure 4A:
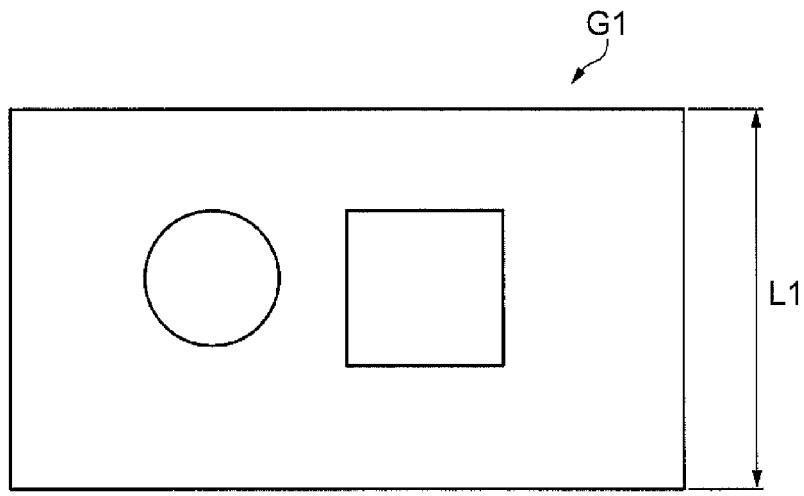
Figure 4B:
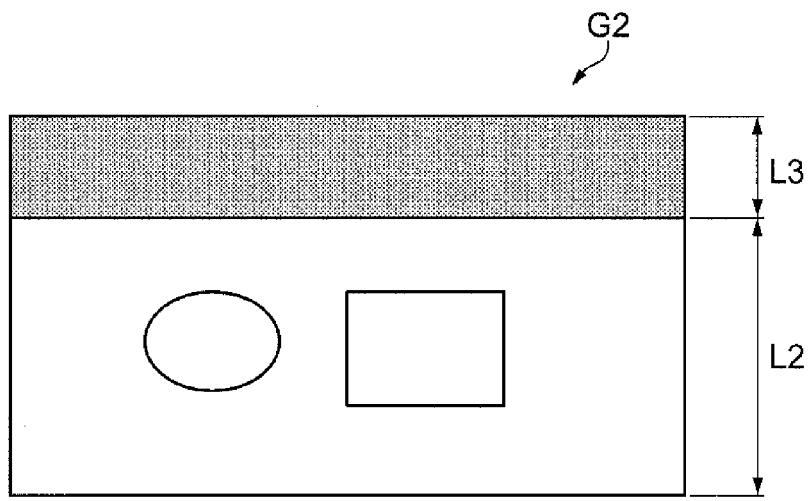

FIGS. 4A and 4B are explanatory views on reduction of image data, in which FIG. 4A is an explanatory view of normal image data; and FIG. 4B is an explanatory view of reduced image data.

In image data G1 of FIG. 4A, graphics of a circle and a square are shown, as image data corresponding to an input image, in an image area having the height L1. In image data G2 of FIG. 4B, the image data corresponding to the input image is reduced and shown in an area having the height L2. In this case, since the image data is reduced in the height direction, the circle becomes an ellipse while the square becomes a rectangle. The pixels in an area of the top portion (height L3) over the reduced image data each have the black pixel value.

Referring back to FIG. 2, the OSD processing unit 32b performs, based on an instruction of the control unit 20, a process for superimposing an OSD (on-screen display) image such as a menu image or a message image on an image (hereinafter also referred to as "input image") based on input image data and displaying the superimposed image. The OSD processing unit 32*b* includes an OSD memory (not shown) and stores therein OSD image information representing a graphic, a font, or the like for forming an OSD image. When the control unit 20 gives an instruction to superimpose the OSD image, the OSD processing unit 32*b* reads necessary OSD image information from the OSD memory and combines the OSD image information with image information such that the OSD image is superimposed on the input image at a predetermined position.

The image processing unit 32 receives, from the control unit 20, control information based on position information of the light-emitting pen 200 detected by the imaging and detecting unit 50. In a drawing mode where drawing is performed with the light-emitting pen 200, the image processing unit 32 stores drawing data in the drawing memory (not shown) based on a position at which a drawing operation (input operation) of the light-emitting pen 200 is performed. Then, the OSD processing unit 32*b* of the image processing unit 32 receives the drawing data of the drawing memory from the image signal input unit 31, and combines the drawing data with image data on which the reducing process and the setting process of the black pixel value have been performed in the image reducing unit 32*a*. The image processing unit 32 in this case corresponds to the drawing unit.

When the image data is restored to the original (default) size after the drawing data is combined with the image data in a reduced state, that is, when the image data is enlarged, the image processing unit 32 enlarges the drawing data at a similar enlargement ratio and combines them. With this configuration, the drawing data drawn on the image data in the reduced state can be displayed in a size at a ratio similar to that of the image data even after enlargement.

Figure 5A:
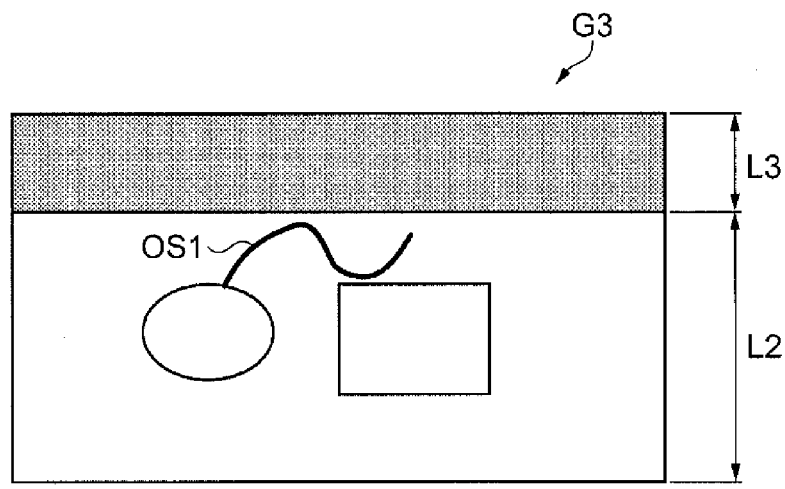
Figure 5B:
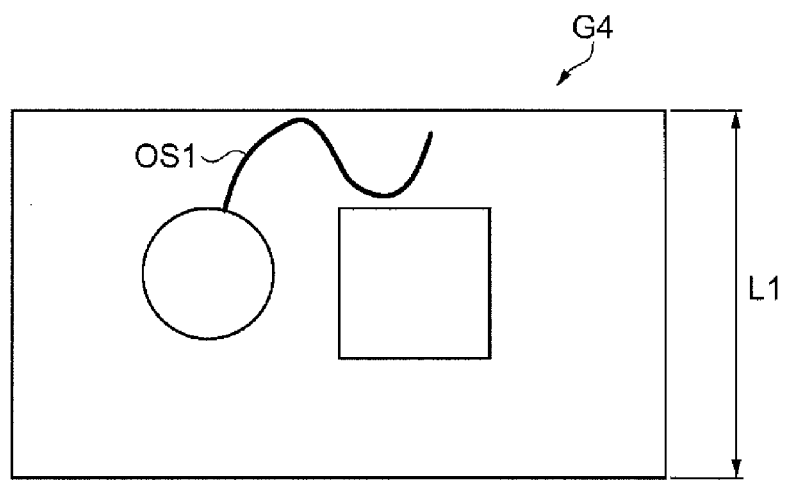

FIGS. 5A and 5B are explanatory views of image data when the image data is restored to the original size, in which FIG. 5A is an explanatory view of image data in the reduced state; and FIG. 5B is an explanatory view of the image data in a state of being restored to the original size.

In image data G3 of FIG. 5A, image data corresponding to an input image is reduced and shown in the area having the height L2. Then, drawing data OS1 drawn with the light-emitting pen 200 is combined with the image data and displayed. Pixels in an area of the top portion (height L3) over the reduced image data each have the black pixel value. In image data G4 of FIG. 5B, the image data is restored to the original (default) size having the height L1. In this case, the drawing data OS1 is enlarged according to the enlargement ratio of the image data and combined therewith.

Referring back to FIG. 2, when the light valve driving unit 14 drives the liquid crystal light valves 12R, 12G, and 12B according to image data input from the image processing unit 32, the liquid crystal light valves 12R, 12G, and 12B form an image according to the image data, and this image is projected through the projection lens 13.

The imaging and detecting unit 50 is configured to include an imaging unit 51, an image analyzing unit 52, and a position information detecting unit 53. The imaging and detecting unit 50 is controlled by the control unit 20. The imaging and detecting unit 50 captures an image of the projection surface S, analyzes the image, and detects position information of the light-emitting pen 200.

The imaging unit 51 includes an imaging element or the like (not shown) formed of a COD sensor, a CMOS (Complementary Metal Oxide Semiconductor) sensor, or the like, and an imaging lens (not shown) for focusing light emitted from an imaging object on the imaging element. The imaging unit 51 is arranged in the vicinity of the projection lens 13 of the projector 100 and captures, based on an instruction of the control unit 20, an image of the projection surface S so as to cover a range including an image (hereinafter also referred to as "projection image") projected onto the projection surface S. Then, the imaging unit 51 successively generates image information (captured image information) representing the image captured (hereinafter also referred to as "captured image") and outputs the generated image information to the image analyzing unit 52.

The image analyzing unit 52 is configured to include a processor for image analysis and a memory (not shown). The image analyzing unit 52 analyzes the captured image information input from the imaging unit 51. The image analyzing unit 52 outputs an analysis result to the position information detecting unit 53. The image analyzing unit 52 converts position information on a captured image into position information on an image based on an image signal.

The position information detecting unit 53 detects, based on the analysis result of the image analyzing unit 52, position information of the light-emitting pen 200. The position information detecting unit 53 outputs the position information of the light-emitting pen 200 to the control unit 20.

In the non-volatile memory of the control unit 20, software (device driver) for utilizing the light-emitting pen 200 as a drawing device or an operating device is stored. In a state where the software is activated, the image processing unit 32 recognizes, based on the position information (control information) input from the imaging and detecting unit 50 via the control unit 20, positions at each of which the light-emitting pen 200 is operated in the projection image. When the light-emitting pen 200 is utilized as a drawing device, the image processing unit 32 stores drawing data in the drawing memory. When the light-emitting pen 200 is utilized as an operating device, the image processing unit 32 performs image processing based on an operation of the light-emitting pen 200.

The light-emitting pen 200 includes at a tip (pen tip) of a pen-like body a pressing button (pressing switch) and a light-emitting diode that emits infrared light. When the user performs an operation (pressing operation) of pressing the pen tip of the light-emitting pen 200 against the projection surface S to press the pressing button, the light-emitting diode emits light.

As described above, the projector 100 of the embodiment can measure the distance HT between the projector 100 and the user H, reduce image data based on an input image according to the user H's height, and project the image data. Next, state transition of the projector 100 when reducing an image will be described.

Figure 6:
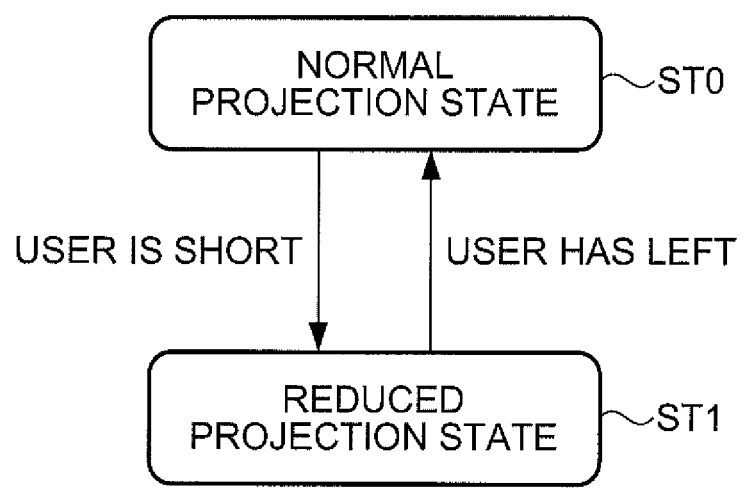
FIG. 6 is a state transition view of the projector.

FIG. 6 is a state transition view of the projector 100.

As shown in FIG. 6, the projector 100 can make the transition between a normal projection state ST0 and a reduced projection state ST1.

The normal projection state ST0 is a state where the projector 100 normally projects an input image. Then, the projector 100 measures the distance HT between the projector and the user H. That is, the projector 100 measures the user H's height. When the user H's height is less than a predetermined height in the normal projection state ST0, the state is shifted to the reduced projection state ST1 where the input image is reduced according to the distance HT and projected.

The reduced projection state ST1 is a state where the projector 100 reduces an input image and projects the image. Then, the projector 100 measures the user H's height. When the projector 100 measures the height in the reduced projection state ST1 and determines that the user H has left, the reducing of the input image is stopped and the state is shifted to the normal projection state ST0 where the input image is normally projected.

Figure 7:
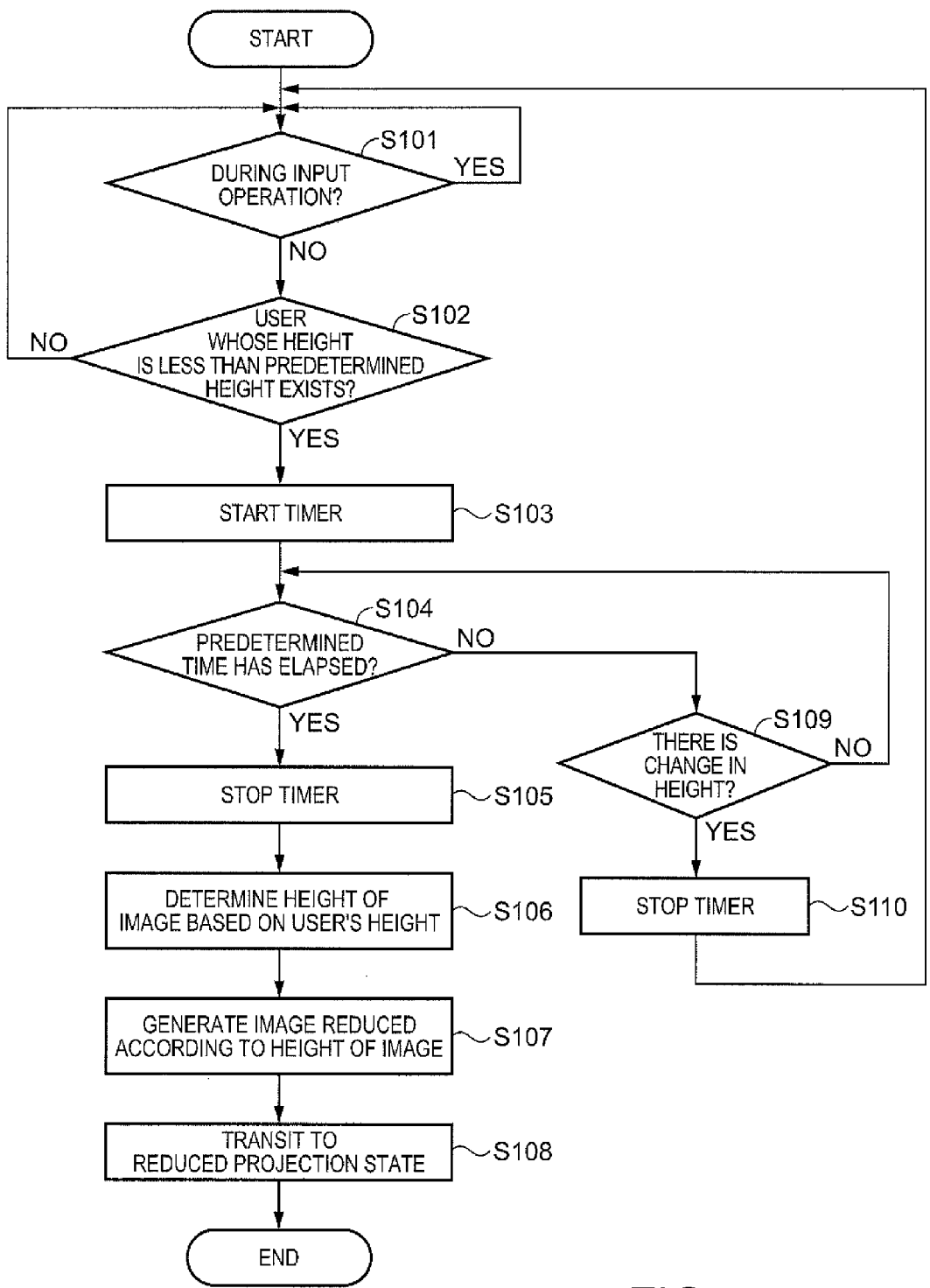
FIG. 7 is a flowchart of a process of the projector in a normal projection state.

Next, a process of the projector 100 in the normal projection state ST0 will be described. FIG. 7 is a flowchart of the process of the projector 100 in the normal projection state ST0.

In the normal projection state ST0, the control unit 20 determines whether or not an input operation (drawing operation) with the light-emitting pen 200, which is detected by the imaging and detecting unit 50, is performed (Step S101). If an input operation is performed (YES in Step S101), the process returns to Step S101.

If an input operation is not performed (NO in Step S101), the control unit 20 determines whether or not a user H whose height is less than the predetermined height exists in a detection area of the height detecting unit 22 (Step S102). If the user H whose height is less than the predetermined height does not exist (NO in Step S102), the process returns to Step S101.

If the user H whose height is less than the predetermined height exists (YES in Step S102), the control unit 20 starts the timer (Step S103). The control unit 20 determines whether or not a predetermined time has elapsed (Step S104). In the embodiment, the predetermined time is three seconds. However, the predetermined time is not limited to three seconds.

If the predetermined time has elapsed (YES in Step S104), the control unit 20 stops the timer (Step S105). The control unit 20 determines the height of an image based on the user H's height (Step S106). Specifically, the control unit 20 calculates the user H's height based on the distance HT between the projector 100 and the user H, and determines the height of the image. In the embodiment, the top of the height of the image is the user H's height.

Then, the control unit 20 issues an instruction to the image reducing unit 32a to generate an image (image data G2) obtained by reducing the input image according to the height of the image (Step S107). Then, the control unit 20 causes the projector 100 to transit to the reduced projection state ST1 (Step S108). Then, the process in the normal projection state ST0 ends.

If the predetermined time has not elapsed (NO in Step S104), the control unit 20 determines whether or not there is a change in the user H's height (Step S109). That is, the control unit 20 determines whether or not the user has been replaced or has left.

If there is no change in the user H's height (NO in Step S109), the process proceeds to Step S104. If there is a change in the user H's height (YES in Step 3109), the control unit 20 stops the timer (Step S110). Then, the process proceeds to Step S101.

Figure 8:
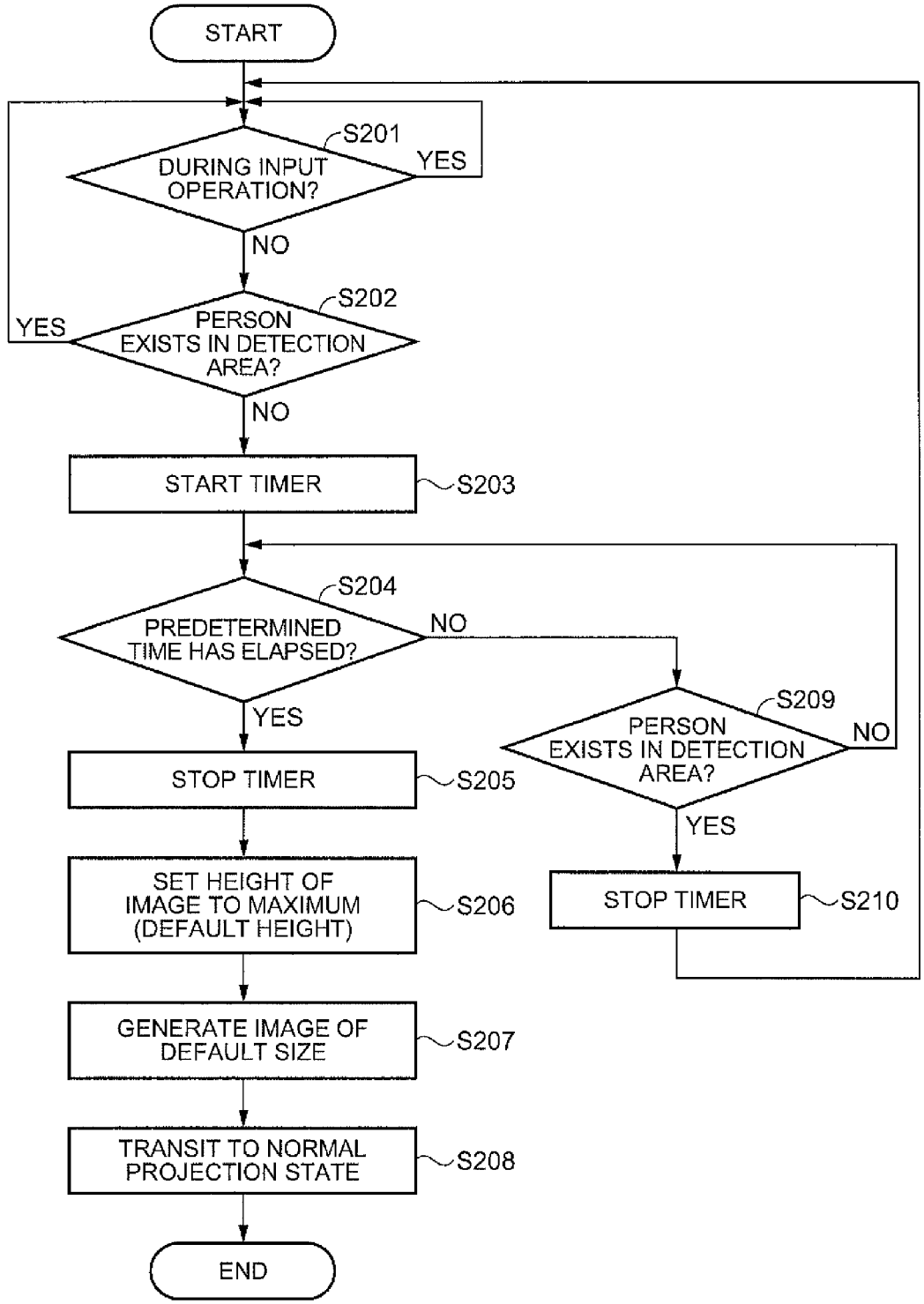
FIG. 8 is a flowchart of a process of the projector in a reduced projection state.

Next, a process of the projector 100 in the reduced projection state ST1 will be described. FIG. 8 is a flowchart of the process of the projector 100 in the reduced projection state ST1.

In the reduced projection state ST1, the control unit 20 determines whether or not an input operation (drawing operation) with the light-emitting pen 200, which is detected by the imaging and detecting unit 50, is performed (Step S201). If an input operation is performed (YES in Step S201), the process returns to Step S201.

If an input operation is not performed (NO in Step S201), the control unit 20 determines whether or not a person (the user H) exists in the detection area of the height detecting unit 22 (Step S202). Specifically, the control unit 20 determines whether or not a person exists based on a result of height detection performed by the height detecting unit 22. If a person exists in the detection area (YES in Step S202), the process returns to Step S201.

If a person does not exist in the detection area (NO in Step S202), the control unit 20 starts the timer (Step S203). The control unit 20 determines whether or not a predetermined time has elapsed (Step S204). In the embodiment, the predetermined time is three seconds. However, the predetermined time is not limited to three seconds.

If the predetermined time has elapsed (YES in Step S204), the control unit 20 stops the timer (Step S205). Then, the control unit 20 sets the height of the image to a maximum (default height) (Step S206).

The control unit 20 issues an instruction to the image reducing unit 32a to generate an image according to the default height. That is, the image reducing unit 32a generates an image (the image data G1) obtained by not reducing an input image (Step S207). Then, the control unit 20 causes the projector 100 to transit to the normal projection state ST0 (Step S208). Then, the process in the reduced projection state ST1 ends.

If the predetermined time has not elapsed (NO in Step S204), the control unit 20 determines whether or not a person (the user H) exists in the detection area (Step S209). That is, the control unit 20 determines whether or not the user H has returned or another user has come.

If a person does not exist in the detection area (NO in Step S209), the process proceeds to Step S204. If a person exists in the detection area (YES in Step S209), the control unit 20 stops the timer (Step S210). Then, the process proceeds to Step S201.

As described above, depending on whether or not the user H whose height is less than the predetermined height exists in the detection area of the height detecting unit 22, the projector 100 can reduce image data, that is, a projection image to reduce the height of the projection image, or can restore the projection image to the default size.

According to the first embodiment described above, the following advantageous effects can be obtained.

(1) The projector 100 detects the user H's height with the height detecting unit 22. The control unit 20 and the image reducing unit 32a reduce, according to the user H's height, image data based on an input image in the height direction. After the user performs an input operation with the pen in the reduced portion, the projection image is restored to the original size. Therefore, even a short user H or a user H in a wheelchair can perform, using an interactive function, a drawing operation in the upper portion of the projection image, so that convenience is improved.

(2) When a person (the user H) has left the detection area of the height detecting unit 22, the projector 100 restores the image data to the default (initial state) size. With this configuration, since the projection image that has been once reduced can be restored to the original size without a manual operation of the user, convenience is high.

(3) The projector 100 does not reduce an image while the user H performs an input operation such as drawing. With this configuration, it is possible to avoid a situation where the user H is confused by a change in size of a projection image during an input operation. For example, this is effective in cases such as where another person has entered the detection area of the height detecting unit 22 during a drawing operation of the user H.

(4) The projector 100 detects the user H's height, and after the predetermined time (three seconds) has elapsed, an image is reduced. With this configuration, it is possible to suppress an abrupt change in size of a projection image. For example, this is effective in cases such as where the user H has entered or left the detection area of the height detecting unit 22.

(5) The projector 100 detects that a person (the user H) does not exist in the detection area of the height detecting unit 22, and after the predetermined time (three seconds) has elapsed, the image is restored to the default size. With this configuration, it is possible to suppress an abrupt change in size of a projection image. For example, this is effective in cases such as where the user H has left the detection area of the height detecting unit 22 and returned thereto.

Second Embodiment

In a second embodiment, a projector that enables the user H to manually specify, using the light-emitting pen 200, a height to which an image is reduced, and an interactive system will be described. In this case, the projector 100 does not need a ranging module.

A configuration of a projector 150 according to the second embodiment is similar to that of the projector 100 of the first embodiment (refer to FIG. 2). Also a configuration of an interactive system 2 according to the second embodiment is similar to that of the interactive system 1 of the first embodiment (refer to FIG. 2). Therefore, the descriptions thereof are omitted.

First, a procedure of reducing an image (image data) using the light-emitting pen 200 will be described.

Figure 9A:
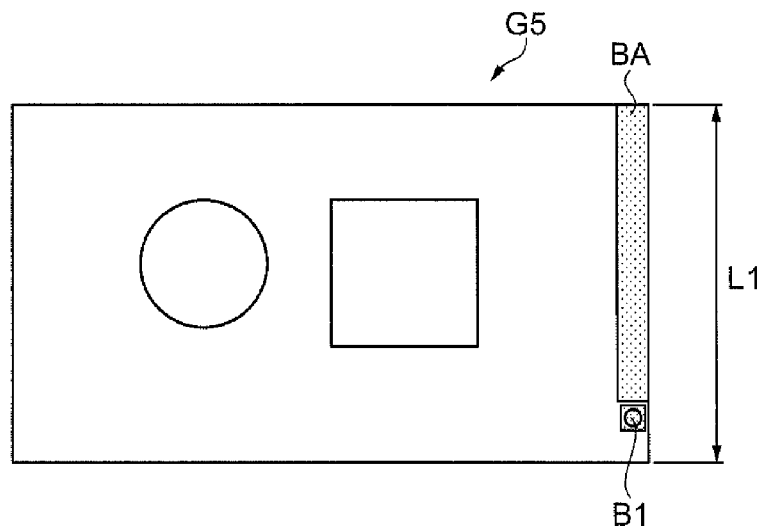
Figure 9B:
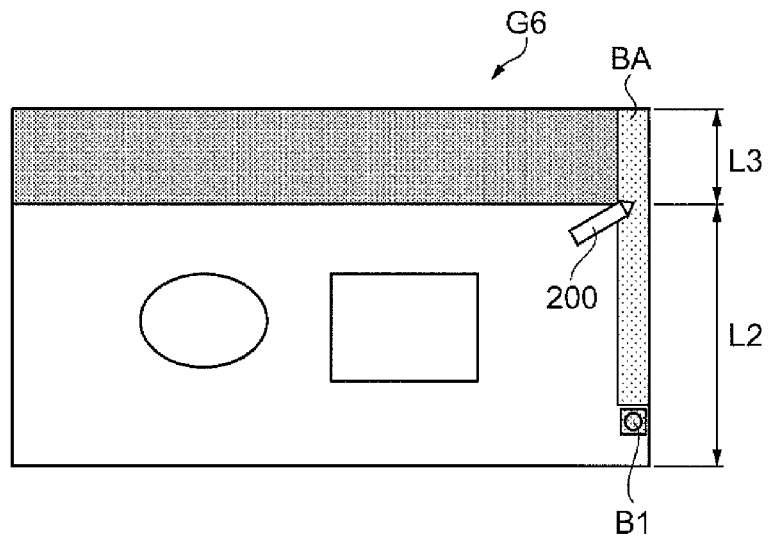

FIGS. 9A and 9B are explanatory views of image data of the projector 150 of the second embodiment, in which FIG. 9A is an explanatory view of normal image data; and FIG. 9B is an explanatory view of reduced image data.

In image data G5 of FIG. 9A, graphics of a circle and a square are shown in the image area having the height L1. Further, a height pointing bar BA and a size restoring button B1 are shown at a right edge of the image data G5. The height pointing bar BA is an area where a position to which an image is reduced is pointed to by the light-emitting pen 200. The size restoring button B1 is a button for restoring the reduced image to the default size. In a state where an image based on the image data G5 described above is projected, the user performs a pointing operation (pressing operation) on the height pointing bar BA or the size restoring button B1 on the projection surface S using the light-emitting pen 200. Therefore, the projector 150 can recognize the operating position and reduce the image data or restore the size of the image data. The height pointing bar BA corresponds to the predetermined area, while the size restoring button B1 corresponds to the predetermined position.

In image data G6 of FIG. 9B, image data corresponding to an input image is reduced and shown in the area having the height L2. Specifically, the reduced image data having the height L2 is obtained by, without moving a lower edge of the image data having the height L1 before being reduced, reducing the image data in the height direction. For this reason, an upper edge of the reduced image data having the height L2 is lower than that of the image data having the height L1 before being reduced. This lowered portion is referred to as L3. Then, pixels in an area of the top portion (height L3) over the reduced image data each have the black pixel value. Further, similarly to the image data G5, the height pointing bar BA and the size restoring button B1 are shown at a right edge of the image data G6. Moreover, the light-emitting pen 200 for pointing to the height pointing bar BA when projecting the image data G6 is shown. In a state where the image data is reduced and projected as described above, when the user performs a pressing operation on the size restoring button B1 with the light-emitting pen 200, the size of the image data is restored, resulting in an image like the image data G5.

Next, an image reducing process of the projector 150 will be described.

Figure 10:
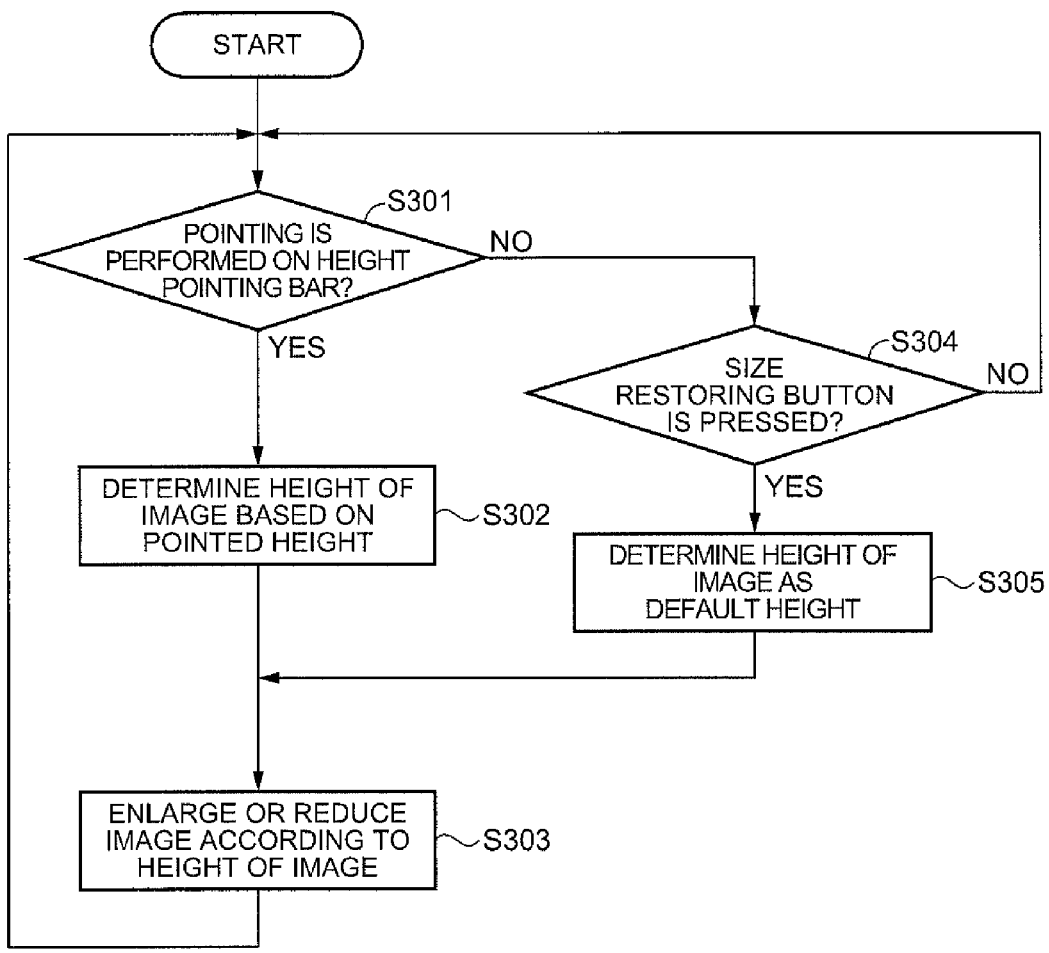
FIG. 10 is a flowchart of an image reducing process of the projector.

FIG. 10 is a flowchart of the image reducing process of the projector 150.

In a state where the projector 150 projects an image, the control unit 20 detects, based on information transmitted from the imaging and detecting unit 50, whether or not pointing (pressing operation) is performed on the height pointing bar BA with the light-emitting pen 200 (Step S301). Prior to Step S301, a message stating that "click the height pointing bar at a reachable height position with the light-emitting pen" may be projected for the user. Moreover, for displaying the height pointing bar BA and determining the height of the image, a normal screen is projected prior to Step S301.

If pointing is performed on the height pointing bar BA (YES in Step S301), the control unit 20 determines the height of the image based on the pointed height (Step S302). In the embodiment, the height pointed to by the light-emitting pen 200 is the height of the image.

The control unit 20 issues an instruction to the image reducing unit 32*a* to generate an image (the image data G6) obtained by reducing, according to the height of the image, image data based on an input image (Step S303). Depending on the pointed position on the height pointing bar BA, reduced image data can be enlarged. Then, the process proceeds to Step S301.

If pointing is not performed on the height pointing bar BA (NO in Step S301), the control unit 20 determines, based on information transmitted from the imaging and detecting unit 50, whether or not a pressing operation of the size restoring button B1 is performed with the light-emitting pen 200 (Step S304). If a pressing operation of the size restoring button B1 is performed (YES in Step S304), the control unit 20 determines the height of the image as the default height (Step S305). Then, the process proceeds to Step S303 where the image is enlarged to the default height.

If a pressing operation of the size restoring button B1 is not performed (NO in Step S304), the process proceeds to Step 3301.

As described above, the projector 150 can reduce image data, that is, a projection image or restore the projection image to the default size with the light-emitting pen 200.

According to the second embodiment described above, the following advantageous effects can be obtained.

(1) When pointing performed on the height pointing bar BA with the light-emitting pen 200 is detected, the projector 150 reduces, according to a pointed height, image data based on an input image in the height direction. With this configuration, since the user H or another user can reduce the height of the projection image to a desired height, even a short user H or a user H in a wheelchair can perform, using an interactive function, a drawing operation in the upper portion of a projection image, so that convenience is improved.

(2) When a pressing operation performed on the size restoring button B1 with the light-emitting pen 200 is detected, the projector 150 restores image data to the default (initial state) size. With this configuration, since the user can restore a reduced projection image to its original size at desired timing, convenience is high.

(3) Since a screen projected onto the projection surface S does not move until the height pointing bar BA or the size restoring button B1 is pressed, an advantageous effect that a projection image does not flicker is provided.

The invention is not limited to the embodiments described above and can be implemented with the addition of various modifications, improvements, and the like. Modified examples will be described below.

Modified Example 1

In the embodiments, when the image reducing unit 32a reduces an image (image data), the image is reduced in the vertical direction. However, the image may be reduced in the lateral direction in addition to the vertical direction. In this case, it is preferable that the image is reduced with the aspect ratio of the original image being maintained. This makes it possible to avoid the distortion of a character, a graphic, or the like displayed on the image. Moreover, by detecting also the position of the user H in the lateral direction, an image may be reduced in the lateral direction so that the image is displayed at a place where the user H easily performs pointing.

Modified Example 2

In the embodiments, the image reducing unit 32a reduces an image (image data). However, the image may not be reduced but may be moved downward. In this case, it is preferable that image data based on an input image is shifted downward. When the image data is shifted downward, the image may conceivably protrude from the pixel region of the liquid crystal light valves 12R, 12G, and 12E. However, when the user H leaves or the size restoring button B1 is pressed, the image can be restored to the default position.

Modified Example 3

In the embodiments, the position information detecting unit 53 of the projectors 100 and 150 detects position information of the light-emitting pen 200, and the control unit 20 performs a process according to the position information. However, the interactive systems 1 and 2 may include a cable (not shown) for transmitting a control signal from the projectors 100 and 150 to the PC 300, and transmit the position information of the light-emitting pen 200 or information of the user H's height detected by the height detecting unit 22 to the PC 300. Then, the PC 300 may reduce image data based on the information of the user H's height or the position information of the light-emitting pen 200, and transmit an image signal of the image data to the projectors 100 and 150 to display the image.

Modified Example 4

In the first embodiment, image data based on an input image is reduced in the height direction according to the user H's height detected by the height detecting unit 22. However, when there are a plurality of users, image data may be reduced to fit the shortest user and displayed.

Modified Example 5

In the embodiments, for the pixels of the top portion over the reduced image data (that is, the pixels in the area in which the pixel values do not exist because the image data is reduced), the black pixel value is set. However, in the pixel area of the top portion over the image data, a character, an illustration, or the like may be displayed. For example, a message stating that "an image is displayed at a low position for facilitating input" may be displayed.

Modified Example 6

In the embodiments, the light-emitting pen 200 that emits infrared light is used as a pointer. However, the pointer is not limited to the light-emitting pen. For example, the pointer may be a pointer that emits visible light, or radio waves for wireless communication or the like may be utilized. Moreover, the pointer may be a user's finger.

Modified Example 7

In the second embodiment, the height pointing bar BA and the size restoring button B1 are operated with the light-emitting pen 200 to reduce an image or restore the image to the default size. However, the imaging and detecting unit 50 may detect a user's gesture, and the projector 150 may reduce image data or restore the image data to the default size according to the types of the gesture.

Modified Example 8

In the embodiments, image data based on an input image is reduced in the height direction according to the user H's height detected by the height detecting unit 22 or the height pointed to on the height pointing bar BA. However, the reduction ratio to be reduced may be a fixed value. Moreover, the reduction ratio of image data may be set using a menu function of the projectors 100 and 150. For example, a wizard-type (interactive-type) image-height setting function may be disposed in the menu function of the projectors 100 and 150. With this configuration, even a user who does not know the pointing method or the like on the height pointing bar BA can easily set the height of image data to be reduced.

Modified Example 9

In the first embodiment, the time for confirming that the user H exists in the detection range of the height detecting unit 22 and the time for confirming that the user H does not exist in the detection range are each set to three seconds as the predetermined time. However, the user may change the predetermined time. For example, the user may set the predetermined time using the menu function of the projectors 100 and 150.

Modified Example 10

In the embodiments, an image signal is input from the PC 300. However, this is not limited to a PC, and other image supply devices may be used. For example, a video reproducing device or the like may be used.

Modified Example 11

In the embodiments, the projectors 100 and 150 receive an image signal from the PC 300 via the cable C1. However, the projectors 100 and 150 may receive an image signal by wireless communication using radio waves or the like.

Modified Example 12

In the embodiments, the projectors 100 and 150 having an interactive function have been described as examples. However, the invention is not limited to a projector. The invention can be applied to an image display device including a detecting device corresponding to the height detecting unit 22 that detects the user H's height or a touch panel or the like that detects an input operation performed on a displayed image. For example, the invention can be applied to a rear projector integrally including a transmissive screen, a liquid crystal display, a plasma display, an organic EL (Electra Luminescence) display, and the like.

Modified Example 13

In the embodiments, the light source 11 is configured to include the discharge-type light source lamp 11a. However, a solid-state light source such as an LED light source or a laser and other light sources can also be used.

Modified Example 14

In the embodiments, the projectors 100 and 150 use as a light modulating device the transmissive liquid crystal light valves 12R, 12G, and 12B. However, a reflective light modulating device such as a reflective liquid crystal light valve may be used. Moreover, a micromirror array device or the like that modulates light emitted from a light source by controlling an emitting direction of incident light micromirror by micromirror, where the micromirror serves as a pixel, can also be used.

Modified Example 15

The drawing unit, the position detecting unit, and the height detecting unit are incorporated in the projector. However, they may be disposed separately from the projector. The height detecting unit may be disposed on a hanging-type metal fitting that supports the projector from a ceiling. The drawing unit that detects the position coordinates of a pen and then draws the trajectory of the pen according to the pen movement may be realized by a PC.

What is claimed is:

1. A projector system that modulates light from a light source via a modulating unit and projects an image onto a projection surface, comprising:
    a position sensor that detects a pointed position of a pointer on the projection surface;
    a memory that stores drawing data based on the pointed position detected by the position sensor;
    a height sensor that detects a height of a user of a projector; and
    one or more processors configured to
        perform drawing on the projection surface according to the pointed position detected by the position sensor, and
        change, according to the user's height detected by the height sensor, a shape of the image projected onto the projection surface or a display position of the image on the projection surface in the case that the user's height is less than a predetermined height threshold and a predetermined time interval elapses after the height sensor detects the user's height,
    wherein the shape of the image or the display position of the image is not changed in the case that the user's height is less than the predetermined height threshold and a change in height is detected by the height sensor during the predetermined time interval after the height sensor detects the user's height.

2. The projector system according to claim 1, wherein the one or more processors are configured to reduce the shape of the image.

3. The projector system according to claim 2, wherein the one or more processors are configured to reduce the shape of the image in a height direction.

4. The projector system according to claim 1, wherein the one or more processors are configured to move the projection position of the image downward.

5. The projector system according to claim 1, wherein when the height sensor detects that the user does not exist, the one or more processors are configured to restore the changed image to its initial shape or its initial projection position.

6. The projector system according to claim 1, wherein the image is projected with a first area included therein, and when the position sensor detects pointing performed on the first area of the image with the pointer, the one or more processors are configured to change the shape of the image or the display position of the image on the projection surface according to a pointed position in the first area.

7. The projector system according to claim 6, wherein the image is projected with a second area included therein, and
    when the position sensor detects pointing performed on the second area of the image with the pointer, the one or more processors are configured to restore the changed image to its initial shape or its initial projection position.

8. A control method of a projector system that modulates light from a light source and projects an image onto a projection surface, comprising:
    detecting a position pointed to by a pointer on the projection surface;
    storing drawing data based on the detected position;
    performing drawing on the projection surface according to the detected position;
    detecting a user's height; and
    changing, according to the detected user's height, a shape of the image projected onto the projection surface or a display position of the image on the projection surface in the case that the detected user's height is less than a predetermined height threshold and a predetermined time interval elapses after the detected user's height is detected,
    wherein the shape of the image or the display position of the image is not changed in the case that the detected user's height is less than the predetermined height threshold and a change in the user's height is detected during the predetermined time interval after the detected user's height is detected.

* * * * *